(12) United States Patent
Logemann et al.

(10) Patent No.: US 7,715,364 B2
(45) Date of Patent: May 11, 2010

(54) DATA SINK/DATA SOURCE, DATA TRANSMISSION DEVICE AND DATA TERMINAL DEVICE FOR A CIRCUIT-SWITCHED AND PACKET-SWITCHED NETWORK

(75) Inventors: Gunter Logemann, Unterhaching (DE); Hasan Palandöken, Gauting (DE); Frank Schäfer, München (DE)

(73) Assignee: Siemens Aktiengesellschaft, Munich (DE)

( * ) Notice: Subject to any disclaimer, the term of this patent is extended or adjusted under 35 U.S.C. 154(b) by 1055 days.

(21) Appl. No.: 10/514,226

(22) PCT Filed: Feb. 26, 2004

(86) PCT No.: PCT/EP2004/001934

§ 371 (c)(1),
(2), (4) Date: Nov. 12, 2004

(87) PCT Pub. No.: WO2004/077772

PCT Pub. Date: Sep. 10, 2004

(65) Prior Publication Data

US 2005/0226217 A1    Oct. 13, 2005

(30) Foreign Application Priority Data

Feb. 26, 2003  (DE) ............................... 103 08 304

(51) Int. Cl.
*H04L 12/66* (2006.01)
(52) U.S. Cl. .................. 370/352; 370/359; 370/419; 370/522; 370/524
(58) Field of Classification Search ................. 370/352, 370/359, 419, 395.2, 465, 329, 335, 342, 370/351, 401; 455/426, 561, 518; 709/232, 709/202, 466; 717/168
See application file for complete search history.

(56) References Cited

U.S. PATENT DOCUMENTS 4,996,685 A * 2/1991 Farese et al. ................. 370/352

(Continued)

FOREIGN PATENT DOCUMENTS

| DE | 19645368 | 4/1998 |
|----|----------|--------|
| EP | 1191753 | 3/2002 |
| WO | WO9815933 | 4/1998 |
| WO | WO0241583 | 5/2002 |

*Primary Examiner*—Curtis Kuntz
*Assistant Examiner*—Phung-Hoang J Nguyen
(74) *Attorney, Agent, or Firm*—King & Spalding L.L.P.

(57) ABSTRACT

The present invention is directed toward, a data sink/data source data transmission device and data terminal device for a circuit-switched and packet-switched network, the ability to eliminate the logical separation between applications, which are based on the circuit-switched network (e.g., PSTN, ISDN), and applications, which are based on the packet-switched network, (e.g., Internet). To this end, a data transmission device for transmitting and receiving data into/from the circuit-switched network includes controllable switchover parts. This data transmission device is or can be assigned to a universally useable unit for automatically processing data and for transmitting and receiving data to/from the packet-switched network and is assigned or can be assigned to the at least one data terminal device for transmitting and receiving data into/from the circuit-switched network. The switch-over parts can be controlled in such a manner that the data terminal device which, in a first operating mode is connected to the circuit-switched device, can be switched from the first operating mode into a second operating mode, during which the data terminal device is connected to the packet-switched network via the data transmission device and the data processing device, and from the second operating mode into the first operating mode.

80 Claims, 4 Drawing Sheets

U.S. PATENT DOCUMENTS

| | | | |
|---|---|---|---|
| 5,157,662 A * | 10/1992 | Tadamura et al. | 370/352 |
| 5,610,910 A * | 3/1997 | Focsaneanu et al. | 370/351 |
| 6,850,986 B1 * | 2/2005 | Peacock | 709/232 |
| 6,954,453 B1 * | 10/2005 | Schindler et al. | 370/352 |
| 2002/0089975 A1 * | 7/2002 | Vaziri et al. | 370/352 |
| 2003/0174685 A1 * | 9/2003 | Hasebe | 370/338 |
| 2004/0210892 A1 * | 10/2004 | Sharma | 717/168 |

* cited by examiner

DATA SINK/DATA SOURCE, DATA TRANSMISSION DEVICE AND DATA TERMINAL DEVICE FOR A CIRCUIT-SWITCHED AND PACKET-SWITCHED NETWORK

BACKGROUND OF THE INVENTION

Publications on the subject of "Home Networking" or the "Connected Home" or "Telephony and Control" talk about the networking of devices in the private field, such as, for example, TVs, personal computers and other devices in everyday life. In this connection, the telephone, fixed network telephone or cordless telephone, serves as the gateway to the circuit-switched network (voice network). Here, access to the packet-switched network (data network)—(e.g., Internet access) is insignificant, and can be effected in various ways.

Figure 1:
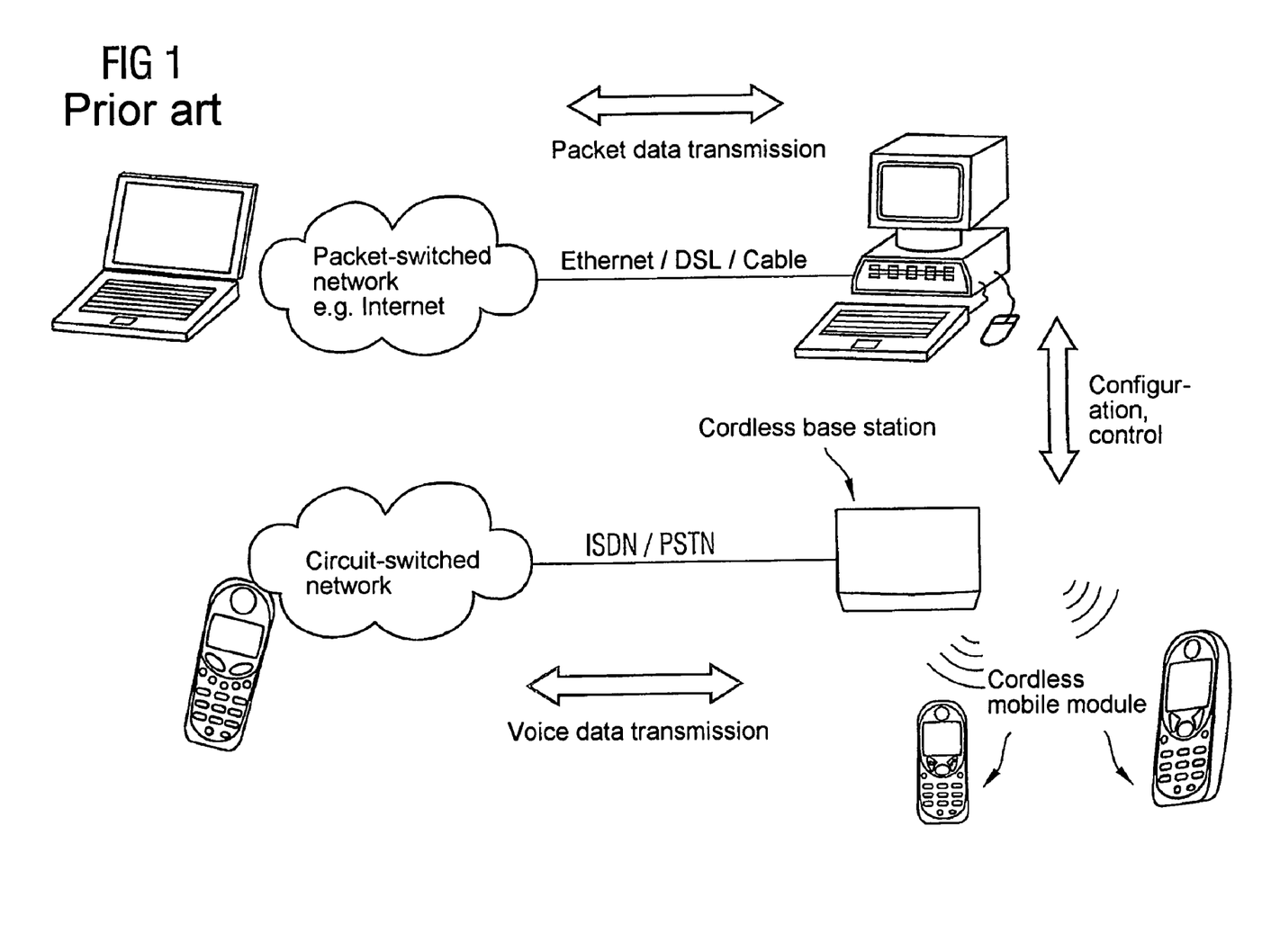
FIG. 1 shows a connection between a packet-switched and circuit-switched network as is known in the prior art.

The connection between the packet-switched and circuit-switched network, as shown in FIG. 1, only exists to the extent that devices, such as a personal computer which is connected to the packet-switched network, (e.g., the Internet), via an Ethernet, Digital Subscriber Line (DSL) or cable link, for the purpose of transmitting data in packets and, for example, a cordless base station which is connected to the circuit-switched network via an ISDN/PSTN network termination for the purpose of speech transmission, request that a connection be established (control), or to configure the device with the help of a cordless mobile module (configuration). In doing this, parts of the cordless base station or the telephone functionality are transferred to the personal computer. The control and configuration also can, of course, be effected in the opposite direction.

What is critical, however, is that no voice data is processed in the packet-switched network or data network, as applicable, but instead there is always a logical link between the voice terminal device, the cordless mobile module, and the switching center, the cordless base station. That is, there is no logical link between the circuit-switched voice network and the packet-switched data network (e.g., the Internet) in relation to voice data. The benefits of voice services in the packet-switched data network (such as, for example, Internet telephony, voice messages) are currently not utilized via a cordless mobile module registered with the cordless base station.

Accordingly, the present invention a data sink/data source, data transmission device and data terminal device for a circuit-switched and packet-switched network which eliminates the logical separation between applications which are based on a circuit-switched network, (e.g., PSTN, ISDN), and applications based on a packet-switched network, (e.g., the Internet).

SUMMARY OF THE INVENTION

The idea underlying the present invention is that a data transmission device for the sending and receiving of data, in particular voice and/or packet data, respectively into the circuit-switched network or out of the circuit-switched network, which is assigned to or can be assigned to a universally usable device for the automatic processing of data and for the sending and receiving of data respectively into the packet-switched network or out of the packet-switched network, and to which is assigned or can be assigned at least one data terminal device for the sending and receiving of data, in particular voice and/or packet data, respectively into the circuit-switched network or out of the circuit-switched network, is provided with a controllable switching facility which can be controlled in such a way that the data terminal device, which in a first operating mode is connected via the data transmission device to the circuit-switched network, can be switched over from the first operating mode to a second operating mode, in which the data terminal device is on one side connected via the data transmission device and the data processing device to the packet-switched network, and vice versa, that a change of operating mode occurs.

The present invention consists in the enhancement of a data transmission device which is, for example, constructed as a cordless base station, by the addition of a switchover capability, which is achieved in accordance with one embodiment preferably by software, so that the voice data streams can be forwarded to a data processing device, which in accordance with claim 24 preferably takes the form of a personal computer, notebook or server for the home and/or the office, and thus makes possible new applications. With a data transmission device devised in this way or with the cordless base station, as applicable, there is then a possibility of forwarding voice and/or signaling data streams to a data processing device, such as a personal computer, which is networked with the Internet. In this way, voice applications which are based on the Internet or a personal computer (such as, for example, Internet telephony, "voice messaging," etc.) can be used by data terminal devices operated at the data transmission device.

As such, data terminal devices, (e.g., a cordless mobile module or a telephone), can switch a logical connection for voice data into the packet-switched network, (e.g., into the Internet or a local data network in the "home networking" scenario).

The main effect of this is to increase user-friendliness. The invention present enables applications, which at present are possible using a headset operated from a personal computer, also to be carried out also on a cordless mobile module.

The switchover capability in the cordless base station, in accordance with the present invention, allows the user the option of setting two operating modes on the cordless mobile module.

In a first operating mode, the cordless mobile module works like a normal telephone on the circuit-switched network.

In a second operating mode, the voice and protocol data are fed to the data processing device (e.g., a personal computer), or to the data network. In this case, there is no connection to the circuit-switched network. In addition, data about the user inputs to the cordless mobile module are forwarded to the personal computer, and display data is sent to the cordless mobile module by the personal computer. In addition, the voice channels are connected transparently to the personal computer, via a so-called tunnel connection.

This enables the cordless mobile module which is connected to the cordless base station to use an application which is running on the personal computer such as, for example, a headset. Additional applications can be activated by interactions with the user via display and control data, whereby the user friendliness, in particular, is further increased. In this way, for example, "Voice over Internet Protocol" telephony (VoIP telephony) becomes possible using a conventional cordless telephone (making the functionality of telephony available to all the applications in a network (e.g., a personal computer in a home network)). In addition, it is possible for the conventional cordless telephone to be used, for example, to perform online games, realize voice control functions in the home network, and operate devices in the home network remotely.

Using the present invention it is also possible, for example, to integrate conventional cordless telephones into a "connected home" scenario. In this situation, the personal computer serves as a "VoIP gateway" for "VoIP telephony." Integration into games consoles, such as the X-Box, is also possible.

Further, the present invention offers the possibility of controlling applications on the data processing device via the data terminal device, on the basis of voice control and voice recognition mechanisms, of using the data terminal device as a remote control unit, of establishing access to Microsoft's Messenger Service via the data terminal device, of realizing an Internet radio, or Internet chatting using the cordless mobile module or a telephone, of converting text messages into voice messages ("Text to Speech") so that, for example, e-mails can be read out, and/or of showing messages on the data terminal device's display.

However, the present invention may be used not only in the home situation as explained above, when the data transmission device takes the form of a cordless base station, the data terminal device a cordless mobile module and the data processing device a personal computer, but also may be used exactly the same in public fields if the data transmission device takes the form of a cellular mobile radio communication infrastructure, consisting of a base station and central switching equipment, the data terminal device takes the form of a mobile telephone, and the data processing device a server.

Additional features and advantages of the present invention are described in, and will be apparent from, the following Detailed Description of the Invention and the Figures.

DETAILED DESCRIPTION OF THE INVENTION

Figure 2:
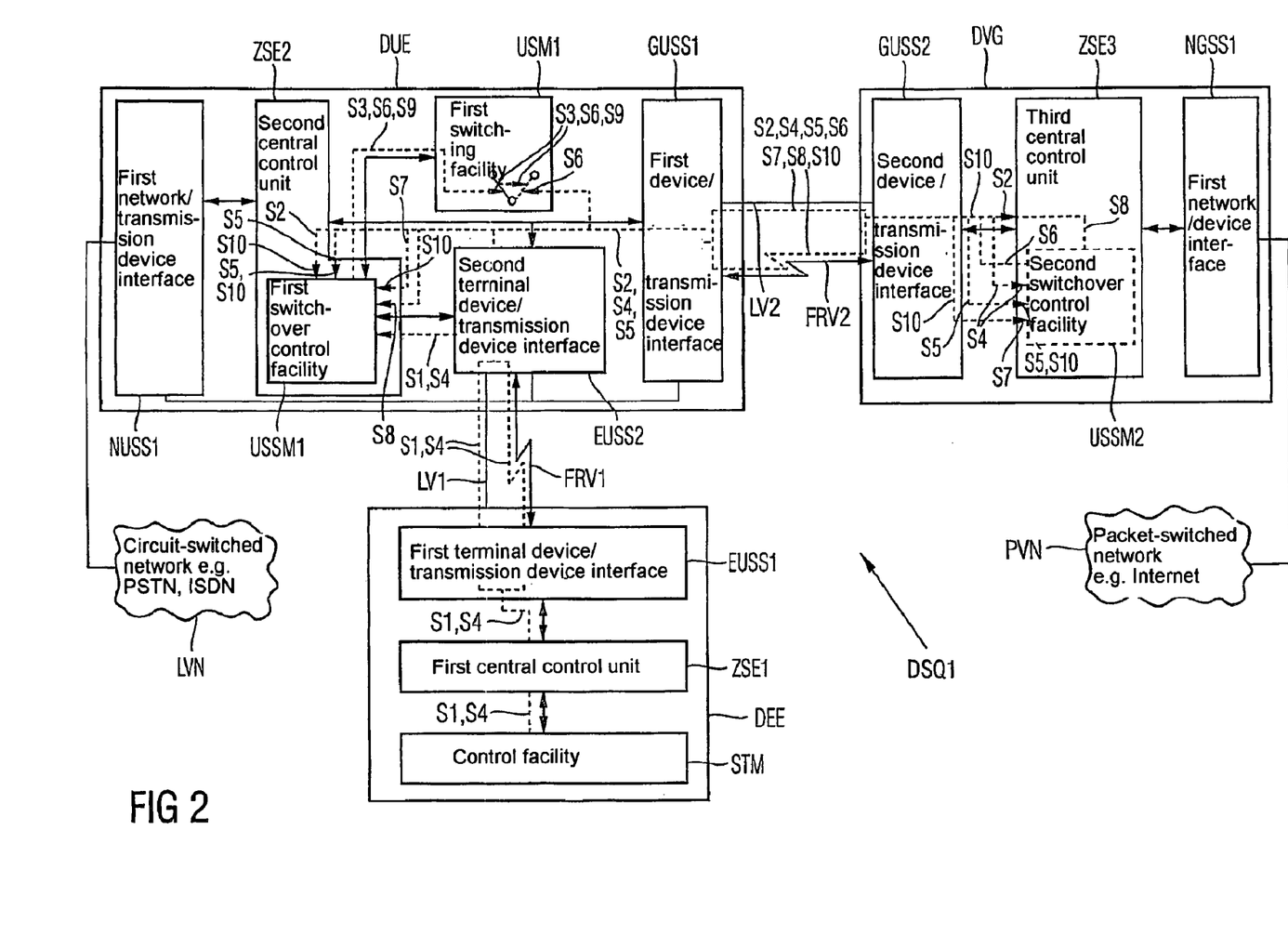
FIG. 2 shows a first data sink/source for a circuit-switched and packet-switched network, consisting of a data terminal device, a data transmission device and a data processing device.

FIG. 2 shows a first data sink/source DSQ1 for a circuit-switched network LVN, preferably in the form of a "Public Switched Telephone Network (PSTN)" or an "Integrated Services Digital Network (ISDN)," and a packet-switched network PVN, preferably in the form of the Internet, consisting of a data terminal device DEE, a data transmission device DÜE and a data processing device DVG.

The data terminal device DEE contains a first central control unit ZSE1, a control facility STM and a first terminal device/transmission device interface EÜSS1. The first central control unit ZSE1 is used to control the functional flows in the data terminal device DEE, and is connected both to the control facility STM and also to the first terminal device/transmission device interface EÜSS1. The data terminal device DEE is connected via the first terminal device/transmission device interface EÜSS1 to the data transmission device DÜE, which has a second terminal device/transmission device interface EÜSS2 for this connection. Either a first line link LV1 or a first air link FRV1 is provided as the link between the data terminal device DEE and the data transmission device DÜE.

Apart from the second terminal device/transmission device interface EÜSS2, the data transmission device DÜE also contains a second central control unit ZSE2, a first network/transmission device interface NÜSS1, a first switching facility USM1 and a first device/transmission device interface GÜSS1. The second central control unit ZSE2, which is used to control the functional flows in the data transmission device DÜE and has a first switchover control facility USSM1, is connected to the second terminal device/transmission device interface EÜSS2, the first network/transmission device interface NÜSS1, and the first device/transmission device interface GÜSS1. Together with the first switching facility USM1, the first switchover control facility USSM1 for the second central control unit ZSE2 forms one functional unit such that the switchover control facility USSM1 controls the switching facility USM1, which is represented in FIG. 2 by the link between the two facilities. The data transmission device DÜE is connected, on the one hand, via the first network/transmission device interface NÜSS1 to the circuit-switched network LVN and, on the other hand, via the first device/transmission device interface GÜSS1 to the data processing device DVG, which for this connection has a second device/transmission device interface GÜSS2. For the link between the data transmission device DÜE and the data processing device DVG, either a second line link LV2 is once again provided or a second air link FRV2.

In addition to the second device/transmission device interface GÜSS2, the data processing device DVG contains yet a third central control unit ZSE3 and a first network/device interface NGSS1. The third central control unit ZSE3, which is used to control the functional flows in the data processing device DVG, and optionally has a second switchover control facility USSM2, shown dashed in FIG. 2, additional to the first switchover control facility USSM1 of the second central control unit ZSE2 in the data transmission device DÜE, is connected to the second device/transmission device interface GÜSS2 and the first network/device interface NGSS1. The data processing device DVG is connected to the packet-switched network PVN via the first network/device interface NGSS1.

Below, using as a basis the explanation of the construction of the first data sink/source DSQ1, the way that the data sink/source DSQ1 functions is explained in respect of the elimination of the logical separation between the first applications, which are based on the circuit-switched network LVN, and the second applications, based on the packet-switched network PVN.

From the point of view of the data terminal device DEE, which has until now, for example, been connected to the circuit-switched network LVN via the first line link LV1 or the first air link FRV1 and the data transmission device DÜE (cf., cordless base station as a data transmission device and cordless mobile telephone as a data terminal device in FIG. 1), this means that the user of the data terminal device DEE can take advantage as desired of services on the circuit-switched network LVN, on the one hand, and of services on the packet-switched network PVN, on the other hand, in each case as the addressee and the sender. In other words, the transmission path from the data terminal device DEE to the circuit-switched network LVN and to the packet-switched network PVN must, in each case, be available to the user as required, that is it can be swapped by the user on demand (change of operating mode of the data terminal device). Thus, in a first operating mode, the data terminal device DEE is, for example, connected to the circuit-switched network LVN via the data transmission device DÜE, and in a second operating mode is connected to the packet-switched network PVN via the data transmission device DÜE and the data processing device DVG.

Because of the link, which already exists for the specified familiar scenario (data terminal device↔circuit-switched network), between the data terminal device DEE and the data transmission device DÜE, the first switching facility USM1 and the first switchover control facility USSM1 are present in the data transmission device DÜE for this purpose, together possibly with the second switchover facility USSM2 in the data processing device DVG and the control facility STM in the data terminal device DEE. Apart from the control facility STM in the data terminal device DEE, which preferably takes the form of a keyboard, all of the facilities mentioned preferably take the form of program modules (software). In place of the keyboard, however, it is also possible to use voice control.

However, for each other conceivable scenario, the distribution of the facilities mentioned still could be different. This would be, for example, in the case of a scenario (data terminal device↔packet-switched network) in which the data terminal device is, for example, connected to the packet-switched network via a line link or an air link and the data processing device. In this case, the switching facility and the switchover control facility preferably will be in the data processing device, while possibly there may be an additional switchover control facilities in the data transmission device.

Alternatively, it is also possible to have configuration in which the data transmission device is connected to the packet-switched device and the data processing device to the circuit-switched network.

For the scenario on which FIG. 2 is based (data terminal device↔circuit-switched network), in which the first switching facility USM1 is in the data transmission device DÜE, then depending on whether (i) only the first switchover control facility USSM1 in the data transmission device DÜE, (ii) the first switchover control facility USSM1 in the data transmission device DÜE and also the second switchover control facility USSM2 in the data processing device DVG, whereby both switchover control facilities USSM1, USSM2, control the first switching facility USM1 in the data transmission device DÜE, (iii) both the first switchover control facility USSM1 in the data transmission device DÜE and also the second switchover control facility USSM2 in the data processing device DVG, whereby however, unlike case (ii), only the first switchover control facility USSM1 controls the first switching facility USM1 in the data transmission device DÜE, there are three embodiments of how the change of operating mode mentioned can be the achieved in the first data sink/source DSQ1.

Embodiment (i)

To describe this embodiment, it is now assumed that the data terminal device DEE is in the first operating mode, for example, in which the data terminal device DEE is linked to the circuit-switched network LVN via the data transmission device DÜE. Of course, the other case in which the data terminal device DEE is in the second operating mode, is also possible.

Suppose the user of the data terminal device DEE now wishes to swap into the second operating mode. The user of the data terminal device DEE initiates the operating mode change concerned by activating the control facility STM.

Then, a first signal S1, to signal the change of operating mode, is transmitted from the data terminal device DEE via the first central control unit ZSE1 and the first terminal device/transmission device interface EÜSS1, under the control of the former, via the first line link LV1 or the first air link FRV1, as applicable, to the second terminal device/transmission device interface EÜSS2 in the data transmission device DÜE, which forwards the first signal S1 transmitted by the data terminal device DEE to the first switchover control facility USSM1.

The first switchover control facility USSM1 then generates a second signal S2 which it transmits to the data processing device DVG and, in turn, to the third central control unit ZSE3, by which the data processing device DVG is informed that the data terminal device DEE wishes to establish a connection to the packet-switched network PVN via the data processing device DVG. After the data processing device DVG has been informed, the first switchover control facility USSM1 generates a third signal S3 and transmits this to the first switching facility USM1. By the transmission of this third signal S3, the first switching facility USM1 is instructed to close the transmission path to the circuit-switched network LVN, which the data terminal device DEE has until now, been using, and in its place to set up a new transmission path via the data processing device DVG to the packet-switched network PVN. In FIG. 2, this operation is indicated in the first switching facility USM1 by the switch symbol. The data terminal device DEE is thereby connected to the packet-switched network PVN, via the second line link LV2 or the second air link FRV2, as applicable, and the data processing device DVG. This transmission path, which belongs to the second operating mode, will now remain connected or set up, as applicable, until the user initiates a new operating mode change, in the same manner, this time a change from the second operating mode to the first operating mode.

Figure 4:
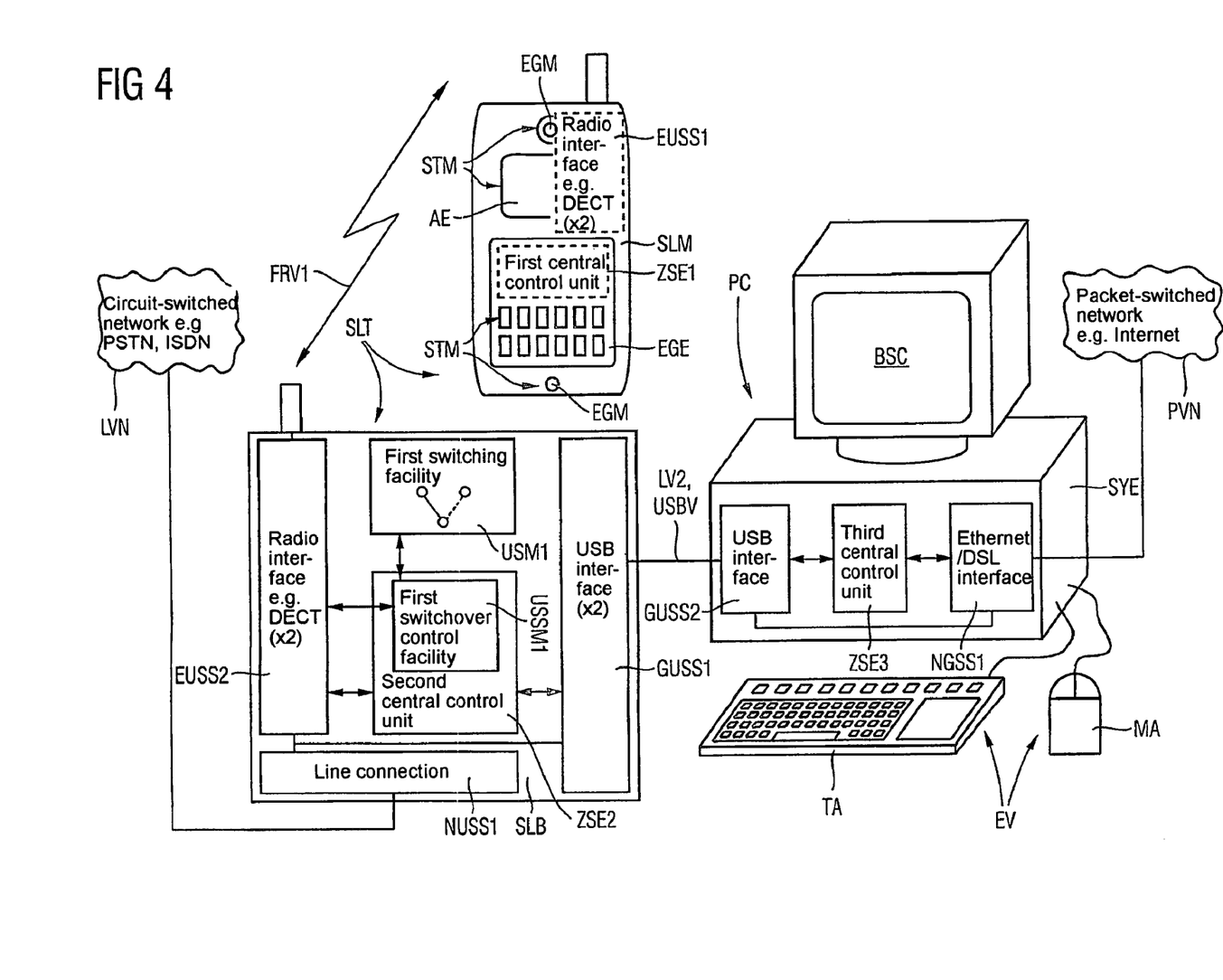
FIG. 4 shows an implementation of the first data sink/source using a cordless telephone and a personal computer.

In order to inform the user of the data terminal device about which operating mode the data terminal device is currently in, the operating mode which is active preferably should, in each case, be indicated on a display on the data terminal device (cf. FIG. 4). It is possible in addition, for data terminal devices which are primarily used for voice transmission (telephony) (cf. FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described from the first operating mode to the second operating mode and if, after a session in the second operating mode ends, the data terminal device has not been reset within a prescribed time, a resetting to the original state (default state) will be effected automatically.

Embodiment (ii)

To describe this embodiment, it is now again assumed that the data terminal device DEE is in the first operating mode, for example, in which the data terminal device DEE is linked to the circuit-switched network LVN via the data transmission device DÜE. Of course, the other case in which the data terminal device DEE is in the second operating mode, also is possible.

Suppose the user of the data terminal device DEE now wishes to swap into the second operating mode, or the first operating mode, as applicable. The user of the data terminal device DEE initiates the operating mode change concerned by activating the control facility STM. For each change, the same key or softkey can, for example, always be used, or different keys also may be used for the two operating mode changes. In the case of voice control, on the other hand, the matter is unambiguous, because the spoken operating mode change always will be effected.

At this point, a fourth signal S4, to signal the change of operating mode, is transmitted from the data terminal device DEE via the first central control unit ZSE1 and the first terminal device/transmission device interface EÜSS1, under the control of the former, via the first line link LV1 or the first air link FRV1, as applicable, to the second terminal device/transmission device interface EÜSS2 in the data transmission device DÜE, via which the fourth signal S4 transmitted from the data terminal device DEE is forwarded either to the first switchover control facility USSM1 in the case of a change to the second operating mode (from which it follows that the current operating mode is the first operating mode), or in the case of a change to the first operating mode (from which it follows that the current operating mode is the second operating mode) via the first device/transmission device interface GÜSS1, the second line link LV2 or the second air link FRV2, as applicable, and the second device/transmission device interface GÜSS2, in that order, to the second switchover control facility USSM2 in the data processing device DVG.

On receiving the fourth signal S4, the first or second switchover control facility USSM1, USSM2, as applicable, will, in each case, then generate a fifth signal S5, with which the other switchover control facility concerned USSM2, USSM1 is informed of the change in operating mode concerned. The fifth signal S5 is transmitted via the first device/transmission device interface GÜSS1, the second line link LV2 or the second air link FRV2, as applicable, and the second device/transmission device interface GÜSS2, or in the opposite direction, to the relevant switchover control facility USSM2, USSM1. After the relevant switchover control facility USSM2, USSM1 has been informed of the change of operating mode, and with it the data processing device DVG or data transmission device DÜE, as applicable, the first or second switchover control facility USSM1, USSM2, as applicable, which received the fourth signal S4 then generates a sixth signal S6, in each case, and transmits this to the first switching facility USM1. If the change is to the second operating mode, the first switchover control facility USSM1 generates the sixth signal S6, while if the change is to the first operating mode, the second switchover control facility USSM1 generates the sixth signal S6. By the transmission of this sixth signal S6, the first switching facility USM1 is instructed to close the transmission path to the circuit-switched network LVN or to the packet-switched network, as applicable, which the data terminal device DEE has until now been using, and in its place to set up a new transmission path via the data processing device DVG to the packet-switched network PVN, or via the data transmission device DÜE to the circuit-switched network LVN, as appropriate. In FIG. 2, this operation is again indicated in the first switching facility USM1 by the switch symbol. The data terminal device DEE is thereby connected, as applicable, either to the packet-switched network PVN, via the second line link LV2 or the second air link FRV2, as applicable, and the data processing device DVG, or to the circuit-switched network LVN via the data transmission device DÜE. This transmission path, which belongs to the second operating mode or the first operating mode, as applicable, will now remain connected or set up, as applicable, until the user initiates another operating mode change in the same manner, this time a change from the second operating mode to the first operating mode, or from the first operating mode to the second operating mode, as applicable.

In order to inform the user about which operating mode the data terminal device is currently in, the operating mode which is active should again, in each case, preferably be indicated on a display on the data terminal device DEE (cf., FIG. 4). It is again possible, in addition, for data terminal devices which are primarily used for voice transmission (telephony) (cf., FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described, from the first operating mode to the second operating mode, or from the second operating mode to the first operating mode, as applicable, and if, after a session respectively in the second operating mode or first operating mode ends, the data terminal device has not been reset within a prescribed time, a resetting to the original state (default state) will be effected automatically.

Embodiment (iii)

To describe this embodiment, again it is now assumed that the data terminal device DEE is in the first operating mode, for example, in which the data terminal device DEE is linked to the circuit-switched network LVN via the data transmission device DÜE. Of course, the other case in which the data terminal device DEE is in the second operating mode, is again also possible.

Suppose the user of the data terminal device DEE now wishes to swap into the second operating mode, or the first operating mode, as applicable. The user of the data terminal device DEE initiates the operating mode change concerned by activating the control facility STM. For each change, the same key or softkey always can, for example, be used, or different keys also may be used for the two operating mode changes. In the case of voice control, on the other hand, the matter is unambiguous, because the spoken operating mode change will always be effected.

At this point, the fourth signal S4, to signal the change of operating mode, is again transmitted from the data terminal device DEE via the first central control unit ZSE1 and the first terminal device/transmission device interface EÜSS1, again under the control of the former, via the first line link LV1 or the first air link FRV1, as applicable, to the second terminal device/transmission device interface EÜSS2 in the data transmission device DÜE, via which the fourth signal S4 transmitted from the data terminal device DEE is forwarded either again to the first switchover control facility USSM1 in the case of a change to the second operating mode (from which it follows that the current operating mode is the first operating mode), or again in the case of a change to the first operating mode (from which it follows that the current operating mode is the second operating mode) via the first device/transmission device interface GÜSS1, the second line link LV2 or the second air link FRV2, as applicable, and the second device/transmission device interface GÜSS2, in that order, to the second switchover, control facility USSM2 in the data processing device DVG.

On receiving the fourth signal S4, the first switchover control facility USSM1 will then generate a seventh signal S7, with which it informs the second switchover control facility USSM2 of the change in operating mode which has been signaled to it. The seventh signal S7 is transmitted via the first device/transmission device interface GÜSS1, the second line link LV2 or the second air link FRV2, as applicable, and the second device/transmission device interface GÜSS2, to the second switchover control facility USSM2. After the switchover control facility USSM2 has been informed of the change of operating mode, and with it the data processing device DVG, the second switchover control facility USSM2 which has received the seventh signal S7 then generates an eighth signal S8 and transmits this via the second device/transmission device interface GÜSS2, the second line link LV2 or the second air link FRV2, as applicable, and the first device/transmission device interface GÜSS1, in that order, to the first switchover control facility USSM1. By this eighth signal S8, the second switchover control facility USSM2 signals to the first switchover control facility USSM1 that the latter should signal to the first switching facility USM1, and thus control, a change from the second operating mode to the first operating mode. The first switchover control facility USSM1 then generates a ninth signal S9, and transmits this to the first switching facility USM1. By the transmission of the ninth signal S9, the first switching facility USM1 is instructed to close the transmission path to the circuit-switched network LVN or to the packet-switched network PVN, as applicable, which the data terminal device DEE has, until now, been using, and in its place to set up a new transmission path via the data processing device DVG to the packet-switched network PVN, or via the data transmission device DÜE to the circuit-switched network LVN, as applicable. In FIG. 2, this operation is again indicated in the first switching facility USM1 by the switch symbol. The data terminal device DEE is thereby connected as applicable either to the packet-switched network PVN, via the second line link LV2 or the second air link FRV2, as applicable, and the data processing device DVG, or to the circuit-switched network LVN via the data transmission device DÜE. This transmission path, which belongs to the second operating mode or the first operating mode, as applicable, will now remain connected or set up, as applicable, until the user initiates another operating mode change, in the same manner, this time a change from the second operating mode to the first operating mode, or from the first operating mode to the second operating mode, as applicable.

In order to inform the user about which operating mode the data terminal device is currently in, the operating mode which is active should again, in each case, preferably be indicated on a display on the data terminal device DEE (cf., FIG. 4). It is again possible, in addition, for data terminal devices which are primarily used for voice transmission (telephony) (cf., FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described, from the first operating mode to the second operating mode, or from the second operating mode to the first operating mode, as applicable, and if, after a session respectively in the second operating mode or first operating mode ends, the data terminal device has not been reset within a prescribed time, a resetting to the original state (default state) will be effected automatically.

For the embodiments (i), (ii) and (iii) presented, it is an advantage if the operating mode change which is signaled using the signals S2, S5, S7, S8 is acknowledged by whichever switchover control facility receives these signals, using a tenth signal S10, before the operating mode change is carried out by the first switching facility USM1.

Figure 3:
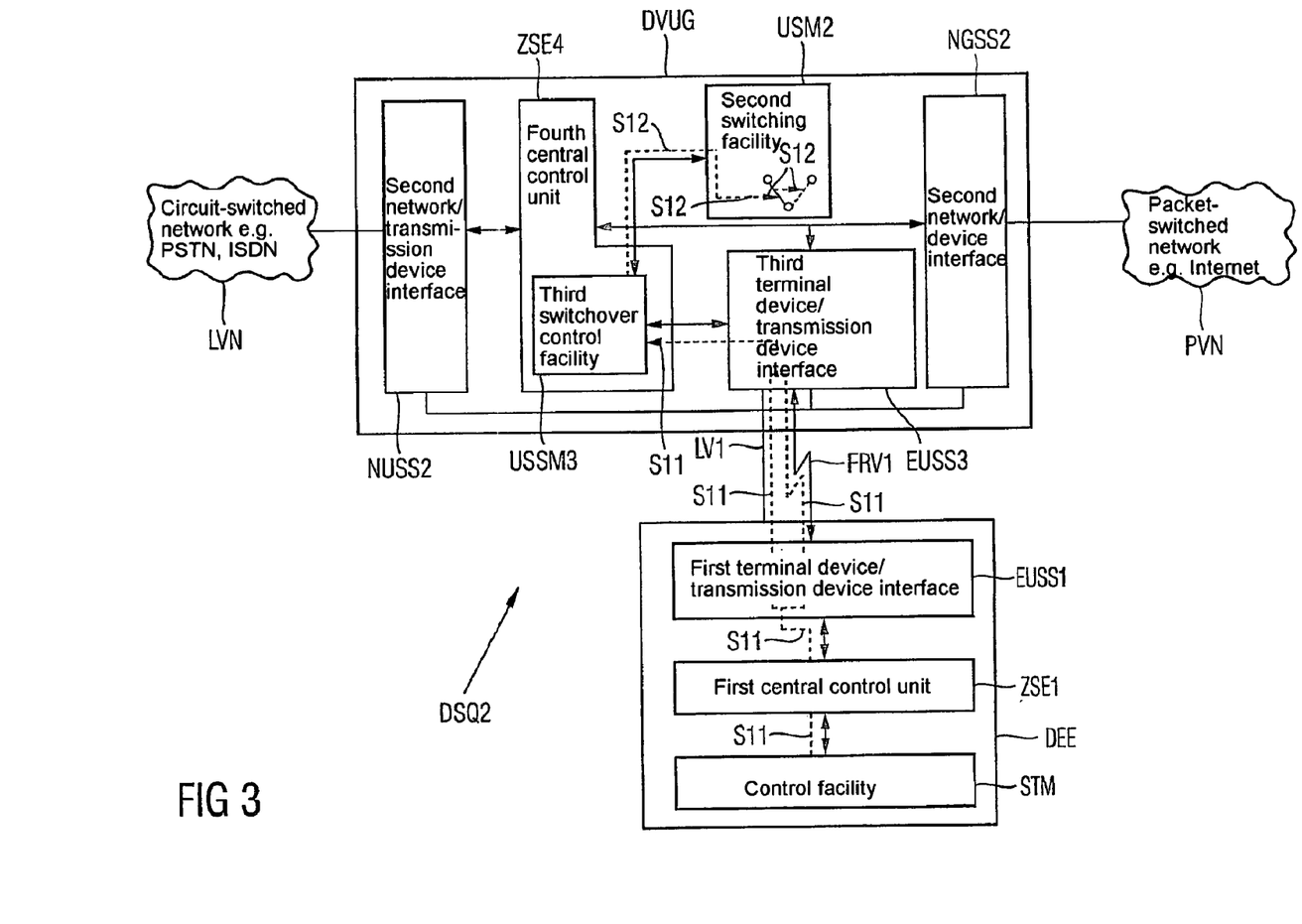
FIG. 3 based on FIG. 2, shows a second data sink/source for a circuit-switched and packet-switched network, consisting of a data terminal device and a data processing/data transmission device.

FIG. 3 shows a second data sink/source DSQ2 for a circuit-switched network LVN, preferably in the form of a "Public Switched Telephone Network (PSTN)" or an "Integrated Services Digital Network (ISDN)," and a packet-switched network PVN, preferably in the form of the Internet, including a data terminal device DEE and a data processing/data transmission device DVÜG. In the data processing/data transmission device DVÜG, the data processing device DVG shown in FIG. 2 and the data transmission device DÜE shown in FIG. 2 are combined to form a single constructional and functional unit.

The data terminal device DEE contains the first central control unit ZSE1, the control facility STM and the first terminal device/transmission device interface EÜSS1. The first central control unit ZSE1 is used to control the functional flows in the data terminal device DEE, and is connected both to the control facility STM and to the first terminal device/transmission device interface EÜSS1. The data terminal device DEE is connected via the first terminal device/transmission device interface EÜSS1 to the data processing/data transmission device DVÜG, which has a third terminal device/transmission device interface EÜSS3 for this connection. Once again, either the first line link LV1 or the first air link FRV1 is provided as the link between the data terminal device DEE and the data processing/data transmission device DVÜG.

Apart from the third terminal device/transmission device interface EÜSS3, the data processing/data transmission device DVÜG also contains a fourth central control unit ZSE4, a second network/transmission device interface NÜSS2, a second switching facility USM2 and a second network/device interface NGSS2. The fourth central control unit ZSE4, which is used to control the functional flows in the data processing/data transmission device DVÜG and has a third switchover control facility USSM3, is connected to the third terminal device/transmission device interface EÜSS3, the second network/transmission device interface NCSS2, and the second network/device interface NGSS2.

Together with the second switching facility USM2, the third switchover control facility USSM3 for the fourth central control unit ZSE4 forms one functional unit such that the switchover control facility USSM3 controls the switching facility USM1, which is represented in FIG. 3 by the link between the two facilities. The data processing/data transmission device DVÜG is connected, on the one hand, via the second network/transmission device interface NÜSS2 to the circuit-switched network LVN, and, on the other hand, via the second network/device interface NGSS2 to the packet-switched network PVN.

Below, using as a basis the explanation of the construction of the second data sink/source DSQ2, the way that the data sink/source DSQ2 functions is explained in respect of the elimination of the logical separation between those first applications, which are based on the circuit-switched network LVN, and those second applications, which are based on the packet-switched network PVN.

For the scenario shown in FIG. 3, it is now assumed that the data terminal device DEE is in the first operating mode; for example in which the data terminal device DEE is linked to the circuit-switched network LVN via the data processing/data transmission device DVÜG. Of course, the other case in which the data terminal device DEE is in the second operating mode, is also possible.

Suppose the user of the data terminal device DEE now wishes to swap into the second operating mode. The user of the data terminal device DEE initiates the operating mode change concerned by activating the control facility STM. At this point, an eleventh signal S11, to signal the change of operating mode, is transmitted from the data terminal device DEE via the first central control unit ZSE1 and the first terminal device/transmission device interface EÜSS1, under the control of the former, via the first line link LV1 or the first air link FRV1, as applicable, to the third terminal device/ transmission device interface EÜSS3 in the data processing/data transmission device DVÜG, which forwards the eleventh signal S11 transmitted by the data terminal device DEE to the third switchover control facility USSM3.

The third switchover control facility USSM3 then generates a twelfth signal S12 and transmits this to the second switching facility USM2. By the transmission of the twelfth signal S12, the second switching facility USM2 is instructed to close the transmission path to the circuit-switched network LVN, which the data terminal device DEE until now has been using, and in its place to set up a new transmission path to the packet-switched network PVN. In FIG. 3, this operation is indicated in the second switching facility USM2 by the switch symbol. The data terminal device DEE is thereby connected to the packet-switched network PVN. This transmission path, which belongs to the second operating mode, will now remain connected or set up, as applicable, until the user initiates another operating mode change, in the same manner, this time a change from the second operating mode to the first operating mode.

In order to inform the user of the data terminal device about which operating mode the data terminal device is currently in, the operating mode which is active preferably should, in each case, be indicated on a display on the data terminal device (cf. FIG. 4). It is possible, in addition, for data terminal devices which are primarily used for voice transmission (telephony) (cf., FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described from the first operating mode to the second operating mode and if, after a session in the second operating mode ends, the data terminal device has not been reset within a prescribed time, a resetting to the original state (default state) will be effected automatically.

FIG. 4 shows the implementation of the first data sink/source DSQ1 in FIG. 2 in accordance with embodiment (i), using as the data terminal device and data transmission device a cordless telephone SLT, which is connected to the circuit-switched network LVN, together with a personal computer PC as the data processing device, this being connected to the packet-switched network. Apart from a screen (monitor) BSC, an input device EV consisting of a keyboard TA and a "mouse" MA, the personal computer PC has the devices as shown in FIG. 2 in a system unit SYE. Thus, in addition to the third central control unit ZSE3, the system unit SYE also contains the second device/transmission device interface GÜSS2, which takes the form of a USB interface (Universal Serial Bus), and the first network/device interface NSSG1 which takes the form of an Ethernet DSL interface (Digital Subscriber Line). The PC is connected to the cordless telephone SLT via a USB connection USBV, LV2 as the second line link. As its data transmission device, the cordless telephone SLT has a cordless base station SLB, and as the data terminal device a cordless mobile module SLM, these being connected to each other via an radio link FRV1 as the first air link. In addition to a display device (AE), the cordless mobile module SLM has an input unit EGE in the form of a keypad and an input facility EGM consisting of a microphone and an encapsulated speaker, the first central control unit ZSE1 and, as the first terminal device/transmission device interface, a first radio interface EÜSS1. The display unit AE, the input unit EGE and the input facility EGM form the control facility STM shown in FIG. 2. In the cordless base station SLB are located the second central control unit ZSE2 with the first switchover control facility USSM1, the first switching facility USM1, a second radio interface EÜSS2 as a second terminal device/transmission device interface, a line connection NÜSS1 as a first network/transmission device interface, and a further USB interface GÜSS1 as a first device/transmission device interface. The connection to the circuit-switched network LVN is established via the line connection NCÜSS1, and the USB interface GÜSS1 is connected to the USB interface GÜSS2 in the personal computer PC via the USB link USBV, LV2.

If the cordless base station SLB is integrated into the personal computer PC as a cordless data adapter, then one obtains the second data sink/source DSQ2 as shown in FIG. 3.

Although the present invention has been described with reference to specific embodiments, those of skill in the art will recognize that changes may be made thereto without departing from the spirit and scope of the present invention as set forth in the hereafter appended claims.

The invention claimed is:

1. A system for data transmission and data reception in a circuit-switched network and a packet-switched network, comprising:
   a) a data transmission device operable to be coupled with the circuit-switched network, to send and receive data to or from the circuit-switched network and to be assigned to a data processing device,
   b) the data processing device operable to be assigned to the packet-switched network and being universally operable to automatically process data as well as to send and receive data to or from the packet-switched network,
   c) at least one data terminal device assigned to said data transmission device and operable to send and receive data to or from the circuit-switched network and to or from the packet-switched network,
   d) wherein the data transmission device comprises switching means operable to be controlled such that the data terminal device, which in a first operating mode for sending and receiving data via the data transmission device is coupled with the circuit-switched network, is operable to be switched from the first operating mode into a second operating mode, in which the data terminal device for sending and receiving data via the data transmission device and the data processing device is coupled with the packet-switched network, and vice versa,
   e) wherein the data transmission device comprises first switchover control means and the data processing device comprises second switchover control means, and wherein the first switchover control means, the second switchover control means, the switching means, and control means of the data terminal device form a functional unit, wherein:
      the control means are operable to signal a change of an operating mode, if the terminal device is currently operating in a first operating mode, to the first switchover control means in the data transmission device or, if the data terminal device is currently in the second operating mode, to the second switchover control means in the data processing device,
      the first switchover control means in the data transmission device are operable to signal the change of operating mode to the second switchover control means in the data processing device, and
      the second switchover control means in the data processing device are operable to signal to the first switchover control means in the data transmission device to control a change of operating mode from the second operating mode to the first operating mode, and the first switchover control means in the data transmission device are operable to control the switching means for a change of operating mode from the first operating mode to the second operating mode.

2. A system as claimed in claim 1, wherein the control means is one of:
a key on a keypad of the at least one data terminal device,
a soft key of the at least one data terminal device, and
a voice control implemented in the at least one data terminal device.

3. A system as claimed in claim 1,
wherein the second switchover control means in the data processing device are operable to control the switching means for a change of operating mode from the second operating mode to the first operating mode.

4. A system as claimed in claim 3, wherein the functional unit is operable such that the change of operating mode signaled by the first switchover control means has to be acknowledged from an opposite end before the change of operating mode is carried out by the switching means.

5. A system as claimed in claim 3, wherein the first switchover control means is contained in a control unit in the data processing and transmission device for controlling functional flows in the data transmission device, and the second switchover control means is contained another control unit in the data processing and transmission device for controlling functional flows in the data processing device.

6. A system as claimed in claim 3, wherein the switchover control means are formed as software modules embodied in computer readable media.

7. A system as claimed in claim 1, wherein:
the first switchover control means in the data transmission device are operable to control the switching means for a change of operating mode from the first operating mode to the second operating mode.

8. A system as claimed in claim 7, wherein the functional unit is operable such that the change of operating mode signaled by the first switchover control means has to be acknowledged from an opposite end before the change of operating mode is carried out by the switching means.

9. A system as claimed in claim 7, wherein the first switchover control means is contained in a control unit in the data processing and transmission device for controlling functional flows in the data transmission device, and the second switchover control means is contained in another control unit in the data processing and transmission device for controlling functional flows in the data processing device.

10. A system as claimed in claim 7, wherein the switchover control means are formed as software modules embodied in computer readable media.

11. A system as claimed in claim 1, wherein the functional unit is operable such that the change of operating mode signaled by the first switchover control means has to be acknowledged from an opposite end before the change of operating mode is carried out by the switching means.

12. A system as claimed in claim 1, wherein the data terminal device and the data transmission device are connected via a first line link.

13. A system as claimed in claim 1, wherein the data terminal device and the data transmission device are connected via a first air link.

14. A system as claimed in claim 13, wherein the data transmission device is assigned to the data processing device via a second line link and wherein the data transmission device is a cordless base station and is linked via the second line link to the data processing device.

15. A system as claimed in claim 14, wherein the second line link is a Universal Serial Bus link.

16. A system as claimed in claim 13, wherein the data transmission device is assigned to the data processing device via a second air link and wherein the data transmission device is a cordless base station, and a cordless module designed for cordless transmissions to the cordless based station is assigned to the data processing device.

17. A system as claimed in claim 13, wherein the data terminal device is a cordless mobile module.

18. A system as claimed in claim 1, wherein the data terminal device is integrated into the data transmission device to form a unit.

19. A system as claimed in claim 1, wherein the data transmission device is assigned to the data processing device via a second line link.

20. A system as claimed in claim 1, wherein the data transmission device is assigned to the data processing device via a second air link.

21. A system as claimed in claim 1, wherein the packet-switched network comprises the data transmission device and the data transmission device is assigned to the data processing device via a tunnel connection.

22. A system as claimed in claim 21, wherein the packet-switched network is selected from the group consisting of: Internet, Local Area Network, and Wide Area Network.

23. A system as claimed in claim 1, wherein the first switchover control means is contained in a control unit in the data processing and transmission device for controlling functional flows in the data transmission device, and the second switchover control means is contained in another control unit in the data processing and transmission device for controlling functional flows in the data processing device.

24. A system as claimed in claim 1, wherein the switching means are formed as software modules embodied in computer readable media.

25. A system as claimed in claim 1, wherein the switchover control means are formed as software modules embodied in computer readable media.

26. A system as claimed in claim 1, wherein the data processing device is one of a personal computer, a notebook, a home server, and an office server.

27. A system as claimed in claim 1, wherein the data are at least one of voice data and packet data.

28. A system for data transmission and data reception in a circuit-switched network and a packet-switched network, comprising:
a) a data processing and transmission device operable to be assigned to the packet-switched network and to be coupled with the circuit-switched network and being universally operable to automatically process data as well as to send and receive data to or from the packet-switched network and to or from the circuit-switched network,
b) at least one data terminal device assigned to said data processing and transmission device and operable to send and receive data to or from the circuit-switched network and to or from the packet-switched network, the data terminal device comprising control means,
c) wherein the data processing and transmission device comprises switching means and switchover control means, the switching means being operable to be controlled such that the data terminal device, which in a first operating mode for sending and receiving data via the data processing and transmission device is coupled with the circuit-switched network, is operable to be switched from the first operating mode into a second operating mode, in which the data terminal device for sending and receiving data via the data processing and transmission device is coupled with the packet-switched network, and vice versa,
- d) wherein the switching means, switchover control means, and control means in the data terminal device form a functional unit,
- e) wherein the control means in the data terminal device signal a change of operating mode to the switchover control means in the data processing and transmission device, and
- f) the switchover control means in the data processing and transmission device control the switching means in the data processing and transmission device for the signaled change of operating mode.

29. A system as claimed in claim 28, wherein the control means are one of:
- a key on a keypad of the at least one data terminal device,
- a soft key of the at least one data terminal device, and
- a voice control implemented in the at least one data terminal device.

30. A system as claimed in claim 28, wherein the data terminal device and the data processing and transmission device are connected via a first line link.

31. A system as claimed in claim 28, wherein the data terminal device and the data processing and transmission device are connected via a first air link.

32. A system as claimed in claim 21, wherein the data processing and transmission device is a data processing device with an integrated cordless data adapter.

33. A system as claimed in claim 21, wherein the data terminal device is a cordless mobile module.

34. A system as claimed in claim 28, wherein the data terminal device is integrated into the data processing and transmission device to form a unit.

35. A system as claimed in claim 28, wherein the data processing and transmission device is one of a set top box, a notebook and a personal computer.

36. A system as claimed in claim 28, wherein the switchover control means in the data processing and transmission device are contained in a control unit in the data processing and transmission device for controlling functional flows in the data processing and transmission device.

37. A system as claimed in claim 28, wherein the switching means are formed as software modules embodied in computer readable media.

38. A system as claimed in claim 28, wherein the switchover control means are formed as software modules embodied in computer readable media.

39. A system as claimed in claim 28, wherein the data processing device is one of a personal computer, a notebook, a home server, and an office server.

40. A system as claimed in claim 28, wherein the data are at least one of voice data and packet data.

41. A data transmission device for a circuit-switched network and packet-switched network, the data transmission device
- a) being operable to be coupled with the circuit-switched network to send and receive data to and from the circuit-switched network,
- b) being operable to be assigned to a data processing device operable to be assigned to the packet-switched network and being universally operable to automatically processes data as well as to send and receive data to or from the packet-switched network,
- c) being operable to be assigned to at least one data terminal device each operable to send and receive data to or from the circuit-switched network and to or from the packet-switched network, and
- d) comprising switching means and first switchover control means, the switching means being operable to be controlled such that the data terminal device, which in a first operating mode for sending and receiving data via the data transmission device is coupled with the circuit-switched network, is operable to be switched from the first operating mode into a second operating mode, in which the data terminal device for sending and receiving data via the data transmission device and the data processing device is coupled with the packet-switched network, and vice versa,
- e) wherein the switching means and first switchover control means, together with control means in the data terminal device, and a second switchover control means in the data processing device, form a functional unit;
- f) wherein if the data terminal device is currently in the first operating mode,
  - the control means are configured to signal a change of operating mode to the first switchover means,
  - the first switchover control means are configured to signal the change of operating mode to the second switchover control means, and
- g) wherein if the data terminal device is currently in the second operating mode:
  - the control means are configured to signal a change of operating mode to the second switchover means, and
  - the second switchover control means are configured to signal the change of operating mode to the first switchover control means.

42. A data transmission device as claimed in claim 41, further comprising
the first switchover control means are configured to control the switching means for the change of operating mode from the first operating mode to the second operating mode.

43. A data transmission device as claimed in claim 41, further comprising
the second switchover control means are configured to control the switching means for the change of operating mode from the second operating mode to the first operating mode.

44. A data transmission device as claimed in claim 41, wherein the functional unit is configured such that the change of operating mode signaled by the first switchover control means is acknowledged by an opposite end before the change of operating mode is carried out by the first switching means.

45. A data transmission device as claimed in claim 41, comprising a first line link through which the data transmission device is connected to the data terminal device.

46. A data transmission device as claimed in claim 41, comprising a first air link through which the data transmission device is connected to the data terminal device.

47. A data transmission device as claimed in claim 41, wherein the data terminal device is integrated into the data transmission device to form a single constructional and functional unit.

48. A data transmission device as claimed in claim 41, comprising a second line link through which the data transmission device is connected to the data processing device.

49. A data transmission device as claimed in claim 41, comprising a second air link through which the data transmission device is connected to the data processing device.

50. A data transmission device as claimed in claim 41, further comprising a control unit comprising the first switchover control means for controlling functional flows in the data transmission device.

51. A data transmission device as claimed in claim 41, wherein the switching means are formed as software modules embodied in computer readable media.

52. A data transmission device as claimed in claim 41, wherein the switchover control means are formed as software modules embodied in computer readable media.

53. A data transmission device as claimed in claim 46, comprising a second line link through which the data transmission device is connected to the data processing device, wherein the data transmission device is a cordless base station which is linked via the second line link to the data processing device.

54. A data transmission device as claimed in claim 53, wherein the second line link is a Universal Serial Bus link.

55. A data transmission device as claimed in claim 46, comprising a second air link through which the data transmission device is connected to the data processing device wherein the data transmission device is a cordless base station, wherein a cordless module designed for cordless transmissions to the cordless base station is assigned to the data processing device.

56. A data transmission device as claimed in claim 41, wherein the data are at least on of voice data and packet data.

57. A data processing and transmission device for a circuit-switched network and a packet-switched network, the data processing and transmission device
   a) being operable to be assigned to the packet-switched network and to be coupled with the circuit-switched network and being universally operable to automatically process data as well as to send and receive data to or from the packet-switched network and to or from the circuit-switched network,
   b) being operable to be assigned to at least one data terminal device each operable to send and receive data to or from the circuit-switched network as well as to or from the packet-switched network, and
   c) comprising switching means and switchover control means, the switching means being operable to be controlled such that the data terminal device, which in a first operating mode for sending and receiving data via the data processing and transmission device is coupled with the circuit-switched network, is operable to be switched from the first operating mode into a second operating mode, in which the data terminal device for sending and receiving data via the data processing and transmission device is coupled with the packet-switched network, and vice versa,
   d) wherein the switching means, switchover control means, and control means in the data terminal device form a functional unit,
   e) wherein the control means in the data terminal device signal a change of operating mode to the switchover control means in the data processing and transmission device, and
   f) the switchover control means in the data processing and transmission device control the switching means in the data processing and transmission device for the signaled change of operating mode.

58. A data processing and transmission device as claimed in claim 57, comprising a first line link through which the data processing and transmission device is connected to the data terminal device.

59. A data processing and transmission as chimed in claim 57, comprising a first dir link through which the data processing and transmission device is connected to the data terminal device.

60. A data processing and transmission as claimed in claim 57, wherein the data terminal device is integrated into the data processing and transmission device to form a single constructional and functional unit.

61. A data processing and transmission device as claimed in claim 57, wherein the data processing and transmission device is one of a set top box, a notebook and a personal computer.

62. A data processing and transmission device as claimed in claim 57, comprising third switchover control means which, together with the switching means and control means and a first central control unit in the data terminal device form a functional unit, wherein
   a) the control means signal a change of operating mode to the third switchover control means; and
   b) the third switchover control means control the switching means for the signaled change of operating mode.

63. A data processing and transmission device as claimed in claim 62, wherein the switchover control means are formed as software modules embodied in computer readable media.

64. A data processing and transmission ion device as claimed in claim 62, wherein the third switchover control means is contained in a fourth central control unit for controlling the functional flow.

65. A data processing and transmission device as claimed in claim 57, wherein the switching means are formed as software modules embodied in computer readable media.

66. A data processing and transmission device as claimed in claim 59, wherein the data processing and transmission device comprises an integrated cordless data adapter.

67. A data processing and transmission device as claimed in claim 57, wherein the data are at least one of voice data and packet data.

68. A data terminal device for a packet-switched network and a circuit-switched network, the data terminal device
   being operable to be assigned to a data transmission device for sending and receiving data to or from the circuit-switched network, wherein the data transmission device is operable to be coupled with the circuit-switched network and operable to be assigned to a data processing device being operable to be assigned to the packet-switched network and being universally operable to automatically process data as well as to send and receive data to or from the packet-switched network,
   comprising control means and a first central control unit for controlling the functional flow in the data terminal device, which are coupled each other and operable to control switching means of the data transmission device such that the data terminal device, which in a first operating mode for sending and receiving data via the data transmission device is coupled with the circuit-switched network, is operable to be switched from the first operating mode into a second operating mode, in which the data terminal device for sending and receiving data via the data transmission device and the data processing device is coupled with the packet-switched network, and vice versa,
   wherein the control means and the first central control unit together with the switching means and first switchover control means in the data transmission device and second switchover control means in the data processing device form a functional unit, and wherein the control means and the first central control unit are configured to signal a change of operating mode to the first switchover control means in the data transmission device, if the data terminal device is currently in the first operating mode, and to signal a change of operating mode to the second switchover control means in the data processing device, if the data terminal device is currently in the second operating mode.

69. A data terminal device as claimed in claim 68, wherein the control means are one of a key on a keypad of the data terminal device, a soft key of the data terminal device, and a voice control implemented in the data terminal device.

70. A data terminal device as claimed in claim 68, comprising a first line link through which the data terminal device is connected to the data transmission device.

71. A data terminal device as claimed in claim 68, comprising a first air link through which the data terminal device is connected to the data transmission device.

72. A data terminal device as claimed in claim 68, wherein the data terminal device is integrated into the data transmission device to form one constructional unit.

73. A data terminal device as claimed in claim 68, wherein the data terminal device is a cordless mobile module.

74. A data terminal device as claimed in claim 68, wherein the data are at least one of voice data and packet data.

75. A data terminal device for a circuit-switched network and a packet-switched network, the data terminal device
being operable to be assigned to a data processing and transmission device which is operable to be coupled with the circuit-switched network and to be assigned to the packet-switched network and universally operable to automatically process data as well as to send and receive data to or from the circuit-switched network and to or from the packet-switched network,
comprising control means and a first central control unit controlling the functional flow in the data terminal device, which are coupled each other and operable to control switching means in the data processing and transmission device such that the data terminal device, which in a first operating mode for sending and receiving data via the data processing and transmission device is coupled with the circuit-switched network, is operable to be switched from the first operating mode into a second operating mode, in which the data terminal device for sending and receiving data via the data processing and transmission device is coupled with the packet-switched network, and vice versa,
wherein the control means are one of a key on a keypad of the data terminal device, a soft key of the data terminal device, and a voice control implemented in the data terminal device, and
wherein the control means and the first central control unit together with switchover control means and the switching means in the data processing and transmission device form a functional unit, wherein:
 a) the control means and the first central control unit signal a change of operating mode to the switchover control means, and
 b) the switchover control means control the switching means for the signaled change of operating mode.

76. A data terminal device as claimed in claim 75, comprising a first line link through which the data terminal device is connected to the data processing and transmission device.

77. A data terminal device as claimed in claim 75, comprising a first air link through which the data terminal device is connected to the data processing and transmission device.

78. A data terminal device as claimed in claim 75, wherein the data terminal device is integrated into the data processing and transmission device to form one constructional unit.

79. A data terminal device as claimed in claim 75, wherein the data terminal device is a cordless mobile module.

80. A data terminal device as claimed in claim 75, wherein the data are at least one of voice data and packet data.

* * * * *